United States Patent [19]
Fusco

[11] 3,709,266
[45] Jan. 9, 1973

[54] AUTOMATIC MITERING TOOL
[76] Inventor: Philip P. Fusco, 123-11 149th Avenue, South Ozone Park, N.Y. 11420
[22] Filed: June 22, 1971
[21] Appl. No.: 155,587

[52] U.S. Cl.......................................83/761, 33/91
[51] Int. Cl............................B27g 5/02, B27b 27/06
[58] Field of Search .........143/90, 87, 86, 169; 33/91

[56] References Cited

UNITED STATES PATENTS

| 1,247,758 | 11/1917 | Watson | 143/90 |
| 1,850,695 | 3/1932 | Scott | 143/90 |
| 3,498,345 | 3/1970 | Sexton | 143/90 |

Primary Examiner—Donald R. Schran
Attorney—Carl Miller

[57] ABSTRACT

A mitering tool with an L-shaped box attachment, the tool automatically adjusting itself so that a mitering cut is made percisely along a plane that bisects the included angle formed by the two sides of a corner being constructed for a frame, the tool basically consisting of a riding block clamped stationarily to a work table, a horizontal threaded rod that is screwed through the riding block along a forward-rearward axis, the rod having a crank handle at a rear end and the forward end being attached to a vertical pivot pin to which a forward end of a pair of expansion track channels are pivoted, and which extend diagonally rearward so as to define the angle of the corner therebetween, each channel having a longitudinal slot in which a fulcrum pin is fitted, each fulcrum pin being mounted on one forward corner of the riding block; and a support block that is attached to the pivot pin being slidable along a track that is formed along a forward-rearward axis of the riding block, the support block carrying a saw guide slot along the forward-rearward axis in which a saw is fitted so that the mitering saw cut is made on the bisected plane of the corner angle.

7 Claims, 13 Drawing Figures

INVENTOR
PHILIP P. FUSCO
BY
Carl Miller
ATTORNEY

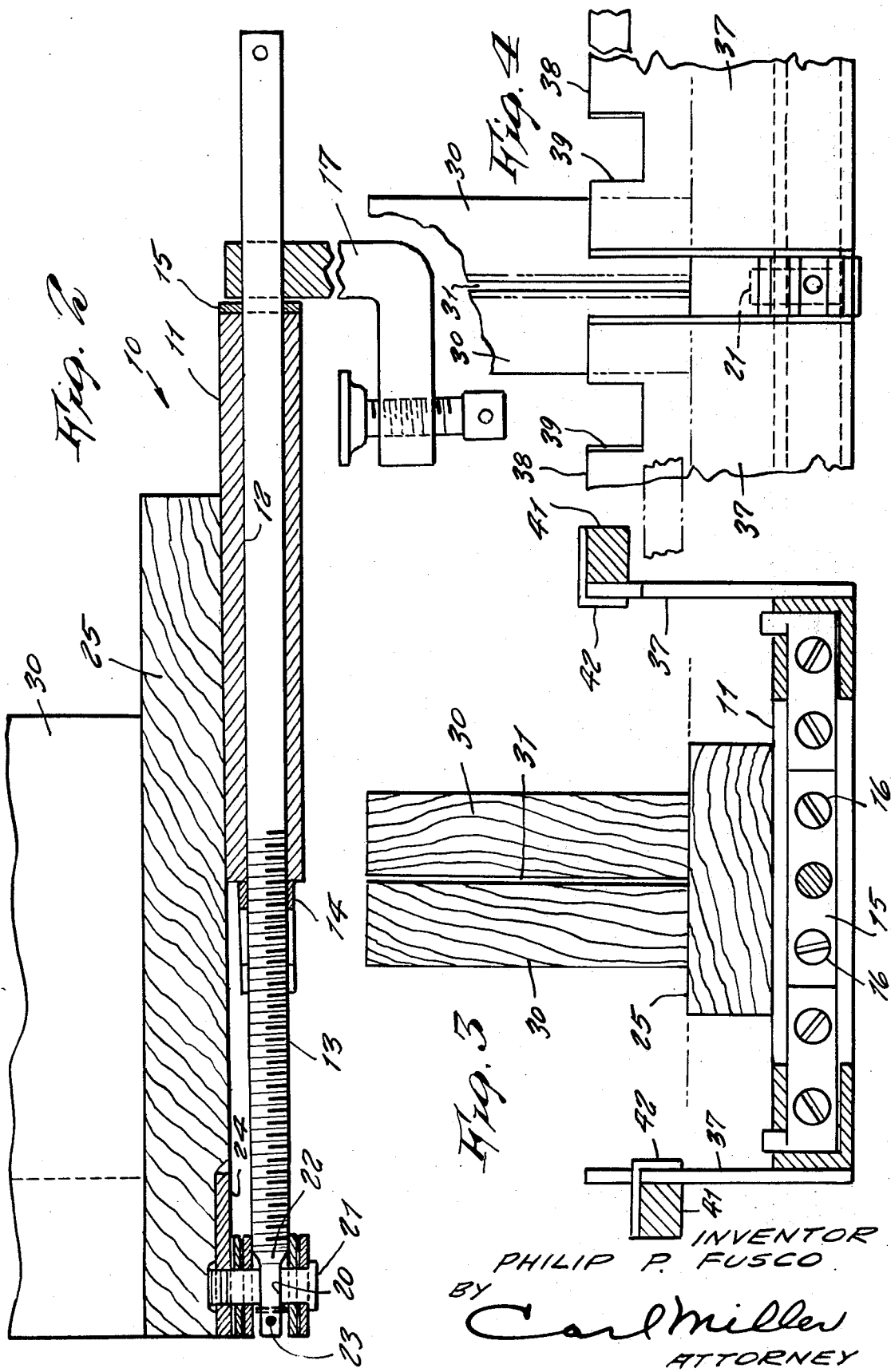

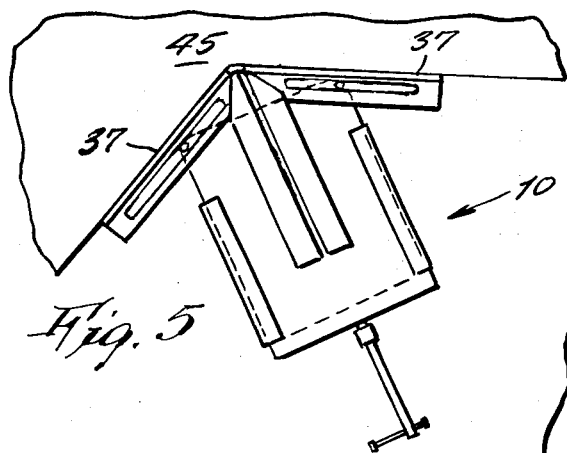
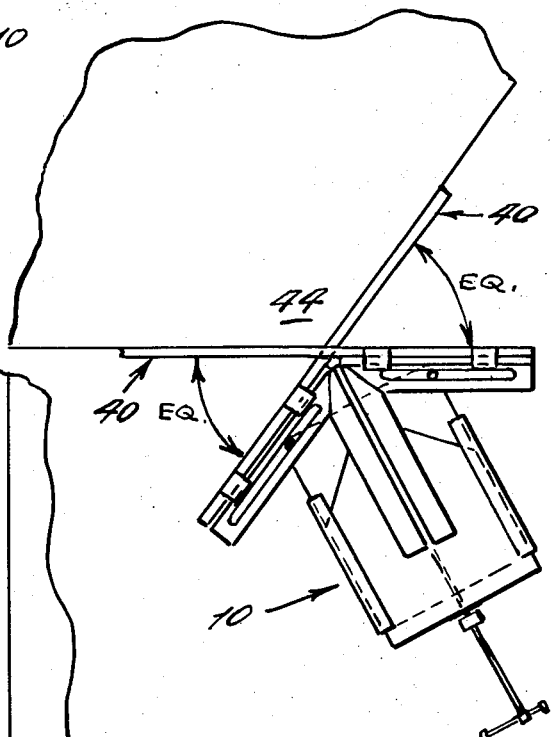
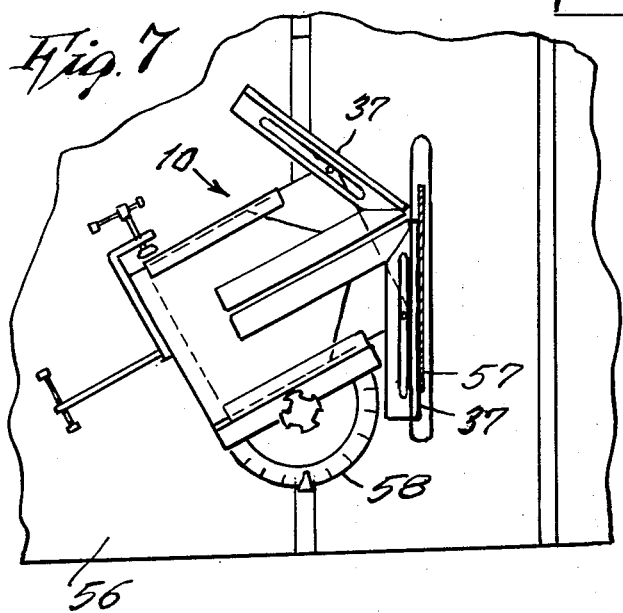
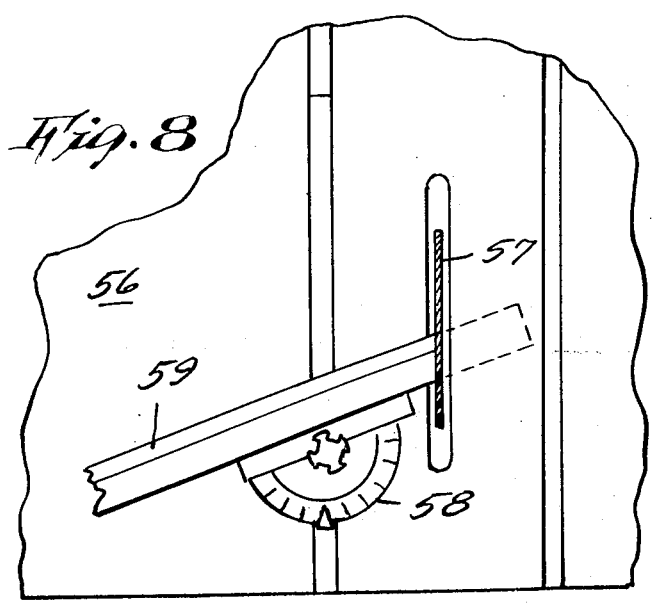

INVENTOR
PHILIP P. FUSCO
BY Carl Miller
ATTORNEY

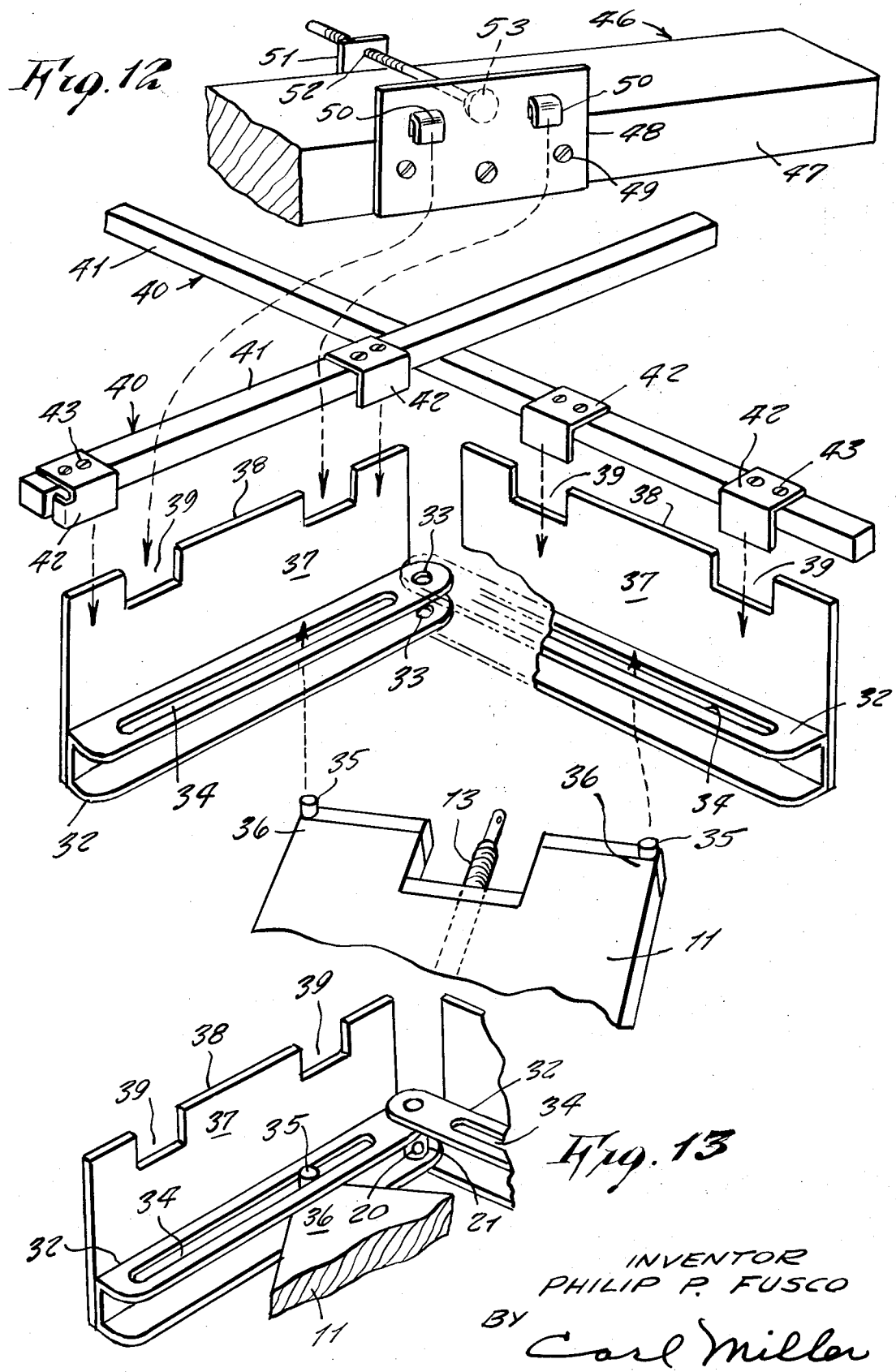

AUTOMATIC MITERING TOOL

This invention relates generally to mitering tools such as are used for constructing a corner of a frame.

It is generally well known that miter boxes are employed for sawing miter cuts in which a frame corner is being constructed of precisely 90° or any other angle to which the miter box is set, however such angle must be first determined by computation, which takes time and is subject to be wrong due to an error in the computation or inability to make the setting with percision accuracy. This situation is therefore objectionable and in want of improvement.

Accordingly it is a principal object of the present invention to provide a mitering tool which automatically sets itself to a mitering cut so to eliminate the above objections, by requiring no computations and making no hand settings from such computations; the present tool making the miter cut quickly and precisioned accurate.

Another object is to provide an automatic mitering toll which can obtain its setting automatically by actually tracing a corner.

Another object is to provide an automatic mitering tool which can trace either an inside corner or an outside corner.

Another object is to provide an automatic mitering tool which accordingly would be particularly ideal for use by carpenters in cutting, for example, the floor and ceiling moldings for corners that are not precisely accurately built to 90° and the like.

Another object is to provide an automatic mitering tool which can be used in conjunction with a power table saw.

Another object is to provide an automatic mitering tool which may be adapted to present adjustable miter boxes, now being marketed, by placing it similarly as for the table saw.

Other objects are to provide an automatic mitering tool which is simple in design, inexpensive to manufacture, rugged in construction, easy to use and efficient in operation.

Further objects of the invention will appear as the description proceeds.

To the accomplishment of the above and related objects, my invention may be embodied in the form illustrated in the accompanying figures, attention being called to the fact, however, that the drawings are illustrative only, and that changes may be made in the specific construction illustrated and described within the scope of the appended claims.

FIG. 2 is a longitudinal cross section on line 2—2 of FIG. 1.

FIG. 3 is an end view on line 3—3 of FIG. 1.

FIG. 4 is an end view on line 4—4 of FIG. 1.

FIGS. 5 thru 8 show the device in use.

Figure 1:
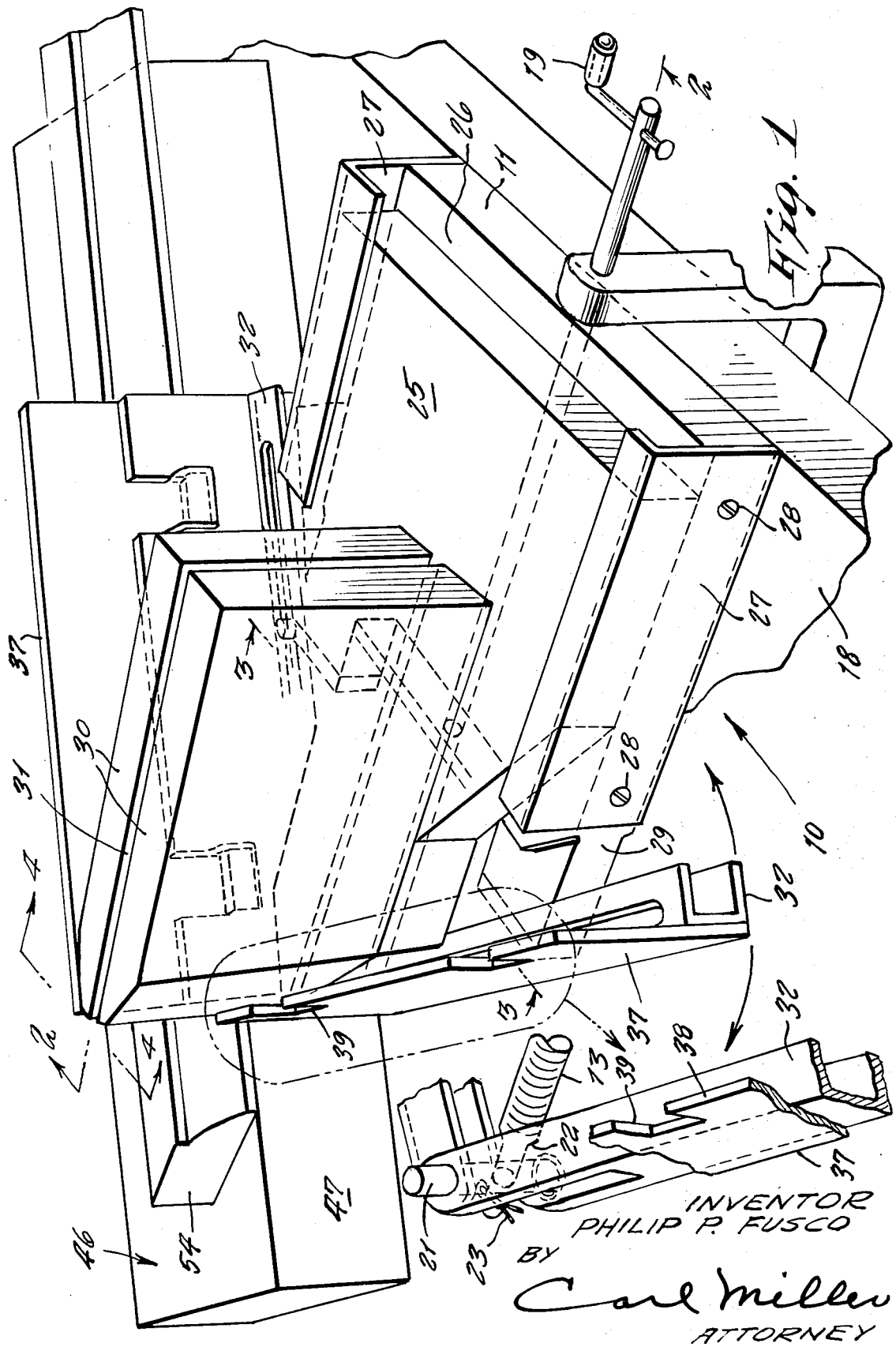
FIG. 1 is a perspective drawing view of the invention
Figure 9:
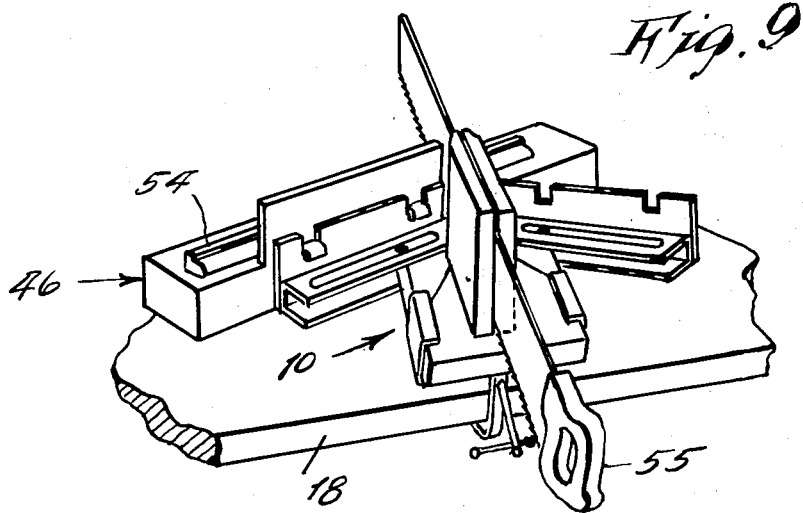

FIG. 9 shows a left hand manual cut made with the invention.

Figure 10:
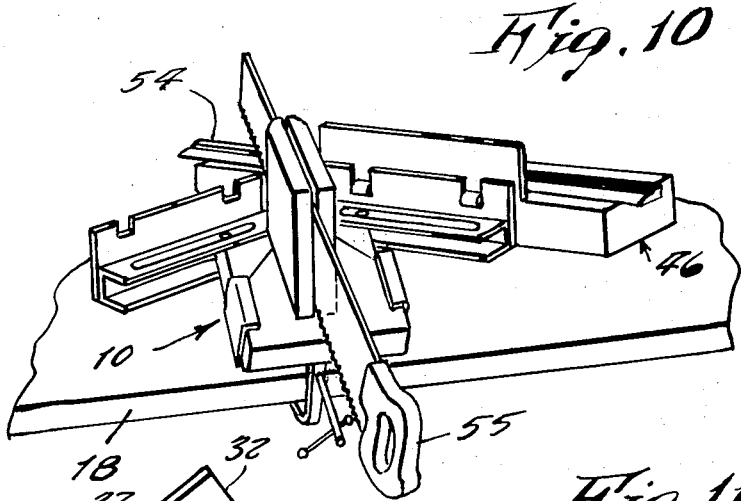

FIG. 10 shows a right hand manual cut being made.

Figure 11:
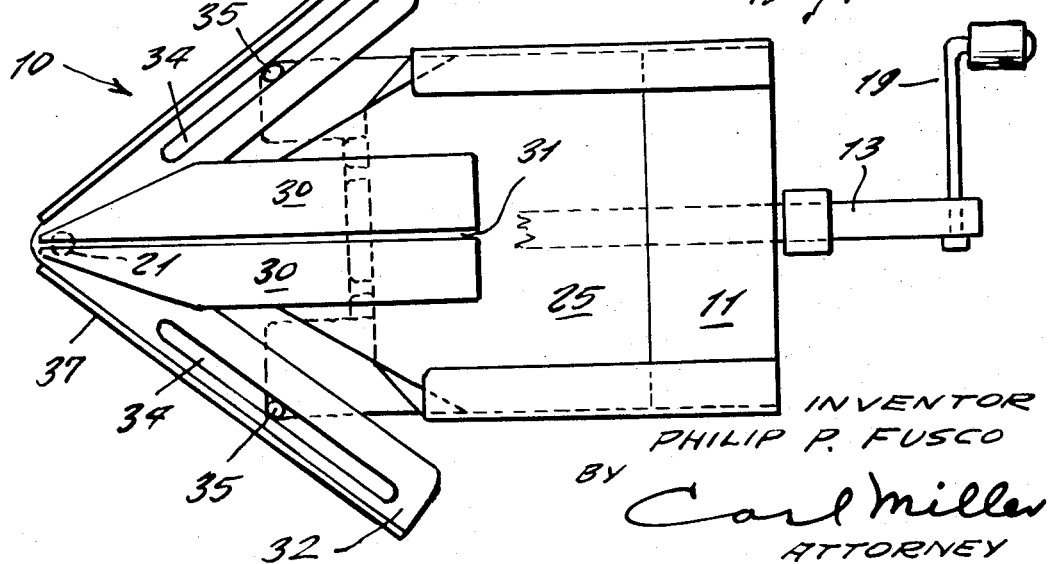

FIG. 11 is a top view of the invention.

FIG. 12 is an exploded view of intercorresponding components of the invention.

FIG. 13 is a fragmentary assembly view of a portion thereof.

Referring now to the drawing in detail, the reference numeral 10 represents an automatic mitering tool according to the present invention wherein there is a riding block 11 of generally rectangular shape and which has a central clearance opening 12 therethrough along a horizontal forward-rearward axis so to receive a threaded rod 13 therethrough. An internally threaded fitting 14 of metal, engaging the rod 13, is secured to one end of the riding block 11 while a flat metal plate 15 is secured by screws 16 to the block other end, the plate 15 having a clearance opening through which an unthreaded portion of the rod 13 extends. Adjacent the plate 15, a clamp 17 is fitted on the rod 13, the clamp being of L-shape and having an adjustable clamp jaw for placement against the underside of a work table or bench 18 so to stationarily secure the mitering tool thereupon.

A rear end of the threaded rod 13 is fitted with a crank handle 19 so that the rod can be moved along the forward-rearward axis.

A forward end of the rod 13 is fitted rotatably free through a transverse opening 20 of a vertically extending pivot pin 21; the rod 13 being longitudinally held captive to the pivot pin by means of a shoulder 22 and a cotter pin 23 between which the pivot pin is positioned.

The pivot pin 21 is secured to a flat plate 24 secured to an underside of a support block 25 that is slideable on top of the riding block 11 along a forward-rearward axis, and which is slidably guided in a track 26 formed by a pair of upstanding side plates 27 secured by screws 28 to the opposite sides 29 of the riding block 11. Upon the support block 25 there are rigidly secured a pair of saw guide blocks 30 with a slot 31 therebetween into which a saw is received for sawing a mitering cut, the slot 31 also extending along the forward-rearward axis, and being directly over the threaded rod 13.

A pair of expansion track channels 32, as best shown in FIG. 12 are comprised each of a metal channel which at its forward end is provided with aligned openings 33 through which the pivot pin is received and about which the channels are pivotable. Each channel has a longitudinal slot 34 within which an upward extending pin 35 is received, the pin 35 each being fixedly mounted upon a forward corner 36 of the riding block 11; each pin 35 forming a component of the stationary riding block thus forming a fulcrum pin about which the channels are pivotable when the forward ends of the channels are moved forwardly or rearwardly in response to the forward-rearward travel of the pivot pin 21 retained on the end of the threaded rod 13 that is forwardly-rearwardly movable by rotation of the crank handle 19. It will now be apparent that both channels 32, in all positions, are at all times at an equal angle to the foreward-rearward axis of the threaded rod 13 as well as the saw guide slot 34. A flat fence plate 37 is welded or otherwise permanently secured to each channel 32, the upper edge 38 of each fence plate having notches 39; the edge 38 and the notches 39 having ability of being adaptable for securement of a pair of removable extension arms 40 thereto.

Each extension arm 40 comprises a cross sectionally square, straight metal bar 41 having a pair of angle brackets 42 secured thereto by screws 43; the brackets 42 being spaced apart on one bar so that the brackets will hook in the notches 39 of either fence plate 37, while the brackets 42 on the other bar being spaced further apart so that the brackets can hook over the edge 38 of either fence plate, as is shown in FIG. 12.

This arrangement permits the arms to be supported at different levels and thus allow the arms to cross each other as is evident in FIG. 12; and so permit the tool to be used in tracing an outside wall corner 44, as shown in FIG. 6. With the arms removed, the tool 10 can be used to trace an inside wall corner 45, as shown in FIG. 5. One of the arms has one of the brackets 42 provided with a bent over tab that is positioned adjacent the scale end edge of the fence plate, as shown in FIG. 2, for location.

The present 10 additionally includes a detachable box 46, which may be of attached to fence plate 37, in a similar manner as attachment of one of the extension arms above described. The box 46 comprises a wooden beam 47 or either 2 × 3 or 2 × 4 cross sectional dimensions and to which an upstanding side plate 48 is attached by screws 49. The plate 48 has a pair of tongues or tabs 50 stuck out for engaging in notches 39 of fence plate 37, as also shown in FIG. 12. Another upstanding plate 51 on an opposite side of the beam 47 has a threaded opening 52 that engages a screw threaded rod of a clamping jaw 53; and between which jaw 53 and the rear side of plate 48 a molding 54 can be clamped for rigid securement while it is being miter cut by a hand saw 55 as shown in FIGS. 9 and 10.

In FIG. 7, the tool 10 is shown positioned on a bench saw 56 with one fence plate 37 aligned with a side of the circular saw blade 57, while a side plate 27 of the riding block rests against the tee-square mitre protractor 58 of the bench saw.

In FIG. 8, a plan view of the bench saw 56 shows a molding 59 being cut.

The following positions apply and are similar for both inside and outside corners:

Position 1 (FIG. 5): The advantage of this tool would be that you simply take it to any corner and making one turning adjustment, you get an exact trace of the corner. At this point, you have automatically set the slot for the cutting saw in the very precise middle of the included angle formed by the two sides of the corner. With other miter tools, this is first done with a bevel tool which is not needed here and is actually built-in to our tool.

Positions 2 and 3 (FIGS. 9 and 10): You take the tool to your work table (clamp to work table with built-in clamp 16.) Place "L-shaped box" to either left or right "Expansion Track Channel" leg and slip in place to hold secure. Then wood or metal to be cut can now be placed in "L-shaped box" against fence (conventional manner). Be sure that extension arms used for outside corners are removed.

Place saw in slot of tool, thereby being able to cut one side of wood or metal joint. By placing "L-shaped box" to other side of tool, make final cut of second half of joint. Ordinary saw can be used instead of special miter saw.

Referring to the drawings, three basic steps are performed in a matter of seconds, for any one corner condition as follows:
1. Tracing corner
   a. inside corner — use AUTOMATIC MITERING TOOL as is (without extension arms)
   b. outside corner — use Extension Arms by adding to Expansion Track Channel
2. Make left hand cut at work table.
3. Make right hand cut at work table.

It should be noted that for outside corner the operator should be sure to remove the extension arms from tool at work table and proceed as usual for inside corners because the extension arms are just to get proper angle.

Thus there is provided an automatic mitering tool having superior advantages over conventional mitering equipment.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

What I claim as new and desire to secure by Letters Patent is:

1. In an automatic mitering tool, the combination of a riding block stationarily securable on a work table, a horizontal, threaded rod, threadingly supported by said riding block on a foreward-rearward central axis of said riding block, a rear end of said rod having a crank handle and a forward end thereof being journalled in a transverse opening of a vertically extending pivot post which is held captive on said rod so to travel along said foreward-rearward central axis in response to cranking of said rod; and means causing said axis to bisect an angle of either an outside or inside corner.

2. The combination as set forth in claim 1 wherein said means includes said pivot post being secured to a forward end of a support block slidable upon said riding block, said riding block having a track along said foreward-rearward central axis to guide the sliding direction of said supporting block, and said supporting block carrying a saw guide slot along said foreward-rearward central axis for receiving a hand saw.

3. The combination as set forth in claim 2 wherein a pair of expansion track channels are each pivoted at their forward ends on said pivot post, each said channel having a longitudinal slot in which is received one pair of upstanding fulcrum pins mounted upon the forward corners of said riding block, so that said channels are angularly equally adjustable respective to said foreward-rearward central axis when said pivot is moved along said axis by said threaded rod.

4. The combination as set forth in claim 3 wherein a fence plate is secured to a side of each said channel, each said fence plate having an upper edge provided with spaced apart notches for removable attachment to one of either an extension arm or an L-shaped box.

5. The combination as set forth in claim 4 wherein said extension arm comprises one of a pair of arms, each one of which comprises a straight bar with a pair of angle brackets secured along a side thereof for looking either over said upper edge or in said notches of said fence plates.

6. The combination as set forth in claim 5 wherein said L-shaped box comprises a wooden beam having upstanding plates secured along opposite sides thereof, one said plate having struck out tabs for hooking in said notches of said fence plate, and the other plate threadingly supporting an adjustable clamp jaw for securement against a molding securable between said plate having said tabs.

7. The combination as set forth in claim 6 wherein said riding block is stationarily securable upon said work bench by means of an L-shaped clamp supported pivotably free on said threaded rod, said clamp being adjustably securable against an underside of said work table.

* * * * *